United States Patent Office 2,783,212
Patented Feb. 26, 1957

2,783,212

CROSS-LINKED COPOLYMERS OF AN ACRYLIC ACID AS CATION EXCHANGING RESINS

Hermann Schnell, Leverkusen-Wiesdorf, Germany, assignor to Farbenfabriken Bayer Aktiengesellschaft, Leverkusen, Germany, a corporation of Germany No Drawing. Application February 16, 1953,
Serial No. 337,230

Claims priority, application Germany February 19, 1952

5 Claims. (Cl. 260—2.2)

This invention relates to a process of producing polymerizates having cation exchanging properties from water-soluble, unsaturated, polymerizable acids.

It has been proposed to prepare cation exchangers by polymerizing and cross-linking water-soluble, unsaturated polymerizable acids, such as acrylic acid, methacrylic acid, maleic acid and vinylsulfonic acid or the salts thereof. The cross-linkage of these polymerized acids has hitherto been effected by copolymerizing the unsaturated acids with polyfunctional vinyl compounds such as divinyl benzene and ethylene glycol dimethacrylate. For obtaining exchangers with particular swelling capacities also water-soluble, polyfunctional vinyl compounds for instance the triacryloyl perhydrotriazine, the trimeric reaction product prepared from formaldehyde and acrylonitrile (see Ballauf and Wegler, Chem. Ber. 81 (1948) page 527 seq.), and ethylene diacrylamide can be employed.

Another way of cross-linkage consists in converting the polymeric, unsaturated acids, such as polyacrylic acid and polymethacrylic acid, into a cross-linked, insoluble product by heating with compounds carrying more than one functional group which can be reacted with COOH-groups. Examples of suitable polyfunctional compounds are polyfunctional alcohols, such as ethylene glycol and pentaerythritol, and polyfunctional amines, such as ethylene diamine and hexamethylene diamine. The cross-linkage of the water soluble, unsaturated acids by copolymerization with water insoluble, polyfunctional vinyl compounds, such as divinyl-benzene, meets with difficulties in the large scale production if the polymerization is to be carried out in an aqueous solution. Because of the insolubility of the polyfunctional vinyl compounds in water the polymers thus obtained are frequently inhomogeneous. The cross-linkage by copolymerization of water soluble, unsaturated acids in an aqueous solution with water soluble, polyfunctional vinyl compounds, such as triacryloyl perhydrotriazine and ethylene diacrylamide, results in homogeneous polymers with a defined swelling capacity; however, relatively large quantities, in many cases up to 30–40 percent by weight, of water soluble, polyfunctional vinyl compounds must be employed to obtain exchangers with very low swelling capacities. Hereby the exchangers are strongly reduced in their capacity and economy.

The cross-linkage of the polymerized, unsaturated acids by heating with polyfunctional alcohols etc. is difficult to perform on a technical scale. The viscous aqueous solutions thus obtained substantially interfere with the evaporation and drying in that crusts formed on the surface of the solution extraordinarily inhibit a thorough drying so that these products cannot be ground due to their softness.

In accordance with the present invention I have found that the above difficulties associated with the manufacture of cation exchangers on the basis of cross-linked polymers can be avoided in simple manner by copolymerizing aqueous solutions of water soluble, unsaturated, polymerizable acids such as acrylic acid, methacrylic acid, and vinyl-sulfonic acid as well as their salts or mixtures of the said compounds with organic cross-linking agents containing at least two polymerizable double bonds in their molecule, for instance divinyl-benzene, ethyleneglycol dimethyl-acrylate, 1,1,1 trimethoxypropanedimethacrylate, triacryl-oyl perhydro triazine and ethylene diacrylamide, if desired in the presence of other polymerizable monoethylene derivatives, containing no free acid groups, such as acrylic acid amide, acrylonitrile, styrene and vinyl chloride, and adding before, during or after the polymerization polyfunctional compounds carrying in their molecule at least two groups capable of combining, if necessary at elevated temperature, with the acid groups of the copolymers or with other reactive groups present in the copolymers as for example with the carbonamide groups in copolymers containing acrylamide. The latter class of compounds includes polyvalent alcohols, such as ethylene glycol, trimethylol propane, glycerol, pentaerythritol, polyfunctional amines, for instance ethanolamine, ethylene diamine and hexamethylene diamine, as well as aldehydes such as formaldehyde. Suitable solvents wherein the polymerization is carried out are, besides water, mixtures of water and water soluble, organic solvents such as methanol, ethanol and acetone. The cross-linkage effected by the copolymerization with the compounds containing at least two polymerizable double bonds results in the formation of gels, which can very easily be made into small particles having large surfaces by grinding or crushing them on rolls. The quantity of the aforesaid compounds containing more than two double bonds, which is required to effect the cross-linkage, may be very low. An addition of 1–10 percent preferably 1–5 percent by weight of these compounds calculated on the amount of the employed unsaturated acids will be sufficient to bring about the desired effect, whereas the polyfunctional compounds capable of reacting with the carboxylic acid or carboxamide groups are applied in amounts of 5–30 percent by weight and the mono-ethylene derivatives in amounts of 5–50 percent by weight calculated on the amount of the polymerizable acids. The gel particles thus obtained can rapidly be dried, the product being obtained in the form of grains which may be employed in most cases as exchangers without a special grinding operation being necessary. The temperature to be applied for drying is preferably chosen between 90°–180° C. so as to effect during or subsequently to the drying process reaction of the acid groups or other reactive groups in the copolymer with the added polyfunctional compounds, whereby exchangers with the desired cross-linkage and consequently the desired swelling capacity are obtained. Under these conditions an insoluble cation exchanger, ready for use, is obtained in a single step. By suitable choice of the character and quantity of the polyfunctional compounds added as cross-linking agents and the drying temperature exchangers with distinct and controlled swelling capacities can be obtained.

The granular, insoluble polyacids obtained according to the process of the invention are especially suited as cation exchangers, i. e. due to their low swelling capacity. Due to their non-toxicity and good compatibility as well as their great exchanging capacity they are especially well suited for medicinal purposes for instance as agents for adsorption of sodium ions in the digestive tract so that they may be employed for treatment of oedemas.

The invention is further illustrated by the following examples without being restricted thereto, the parts given being by weight.

Example 1

A solution of 180 parts of acrylic acid, 20 parts of pentaerythritol and 6 parts of triacryloyl perhydrotriazine in 700 parts of water is mixed while stirring at 35° C. after addition of 0.75 part of potassium persulfate and 0.5 part of formamidine sulfinic acid while passing over nitrogen. The solution polymerizes to form a solid gel within one hour with self-heating to 70° C. The crumbly, colorless, transparent gel obtained is ground to about 1 mm. sized particles. The comminuted gel is dried at 130° C. for 12 hours. Colorless, hard grains are thus obtained which may directly be employed as exchangers. The swelling capacity of the exchanger may be exemplified by their increase in weight. 1 gram of the product gains 0.58 gram on storing in water, 0.54 grams in n/10 HCl and 0.70 gram in a 0.25 percent sodium bicarbonate solution. The capacity of the exchanger against 1/n caustic soda solution amounts to 8.4 milliequivalents of sodium per gram.

*Example 2*

A solution of 180 parts of acrylic acid, 20 parts of 1,1,1-trimethoxypropane (trimethylolpropane) and 10 parts of ethylene diacrylamide in 700 parts by volume of water after addition of 1 part of potassium persulfate is stirred at 45° C. until the solution is converted by polymerization into a hard, brittle gel. The gel is comminuted and dried for 12 hours at 130° C. There are obtained colorless, hard grains which may be used as cation exchangers.

*Example 3*

A solution of 90 parts of methacrylic acid, 2.5 parts of trimethylolpropane dimethacrylate and 10 parts of ethylene diamine acetate is kept while stirring at 45° C. after addition of 0.6 part of potassium persulfate and 0.45 part of $K_2S_2O_5$ and after the air had been displaced by nitrogen. After a few hours a brittle gel is obtained, which is dried after comminution at 140° C. The hard colorless grains obtained may be used as such or after further comminution as cation exchangers having a high capacity.

*Example 4*

A solution of 160 parts of acrylic acid, 20 parts of acrylonitrile, 20 parts of pentaerytritol and 6 parts of triacrylol perhydrotriazine in 700 parts by volume of water is stirred at 40° C. after addition of 0.7 part of potassium persulfate and 0.5 part of formamidine sulfinic acid in a nitrogen atmosphere until the solution is converted by polymerization into a solid gel. The solid gel is dried for 12 hours at 130° C. There are obtained hard colorless grains which may be used as cation exchangers in view of their high exchanging capacity and their low swelling capacity.

I claim:

1. A process for preparing a water-insoluble resin capable of exchanging cations in a liquid medium which comprises copolymerizing a mixture including (1) a polymerizable water-soluble organic acid selected from the group consisting of crylic acid and methacrylic acid and (2) about 1 to 10 percent by weight, as calculated on the polymerizable acid, of a polymerizable organic compound containing at least two polymerizable double bonds in the presence of a polymerization catalyst and condensing the resulting copolymerizate with (3) about 5–30 percent by weight, as calculated on the polymerizable acid, of a compound selected from the group consisting of polyhydric alcohols, polyamines and aldehydes.

2. A process according to claim 1, wherein the copolymerization is carried out in the presence of about 5–50 percent by weight calculated on the polymerizable acid of a polymerizable monoethylene compound containing no free acid groups, said monoethylene compound being selected from the group consisting of acrylic acid amide, acrylonitrile, styrene and vinylchloride.

3. A water-insoluble cation exchanging resin which is a copolymer of (1) a polymerizable water-soluble organic acid selected from the group consisting of acrylic acid and methacrylic acid and (2) about 1 to 10 percent by weight as calculated on the polymerizable acid of a polymerizable organic compound containing at least two polymerizable double bonds, part of the reactive groups of said copolymer being condensed with (3) about 5 to 30 percent by weight as calculated on the polymerizable acid of a compound selected from the group consisting of polyhydric alcohols, polyamines and aldehydes.

4. A water-insoluble cation exchanging resin according to claim 3, wherein the copolymer contains about 5–50 percent by weight calculated on the polymerizable acid of a polymerizable monoethylene compound containing no free acid groups, said monoethylene compound being selected from the group consisting of acrylic acid amide, acrylonitrile, styrene and vinyl chloride.

5. A process for exchanging cations in liquid media which comprises contacting said liquid media with a resin according to claim 3.

References Cited in the file of this patent

UNITED STATES PATENTS

| | | |
|---|---|---|
| 2,527,300 | Dudley | Oct. 24, 1950 |
| 2,595,779 | Dudley | May 6, 1952 |
| 2,611,730 | Heming | Sept. 23, 1952 |